(12) United States Patent
Wu et al.

(10) Patent No.: US 11,056,983 B1
(45) Date of Patent: Jul. 6, 2021

(54) POWER CONVERTING DEVICE AND METHOD WITH HIGH-FREQUENCY INVERTER MODULE COMPENSATING LOW-FREQUENCY INVERTER MODULE

(71) Applicant: NATIONAL TSING HUA UNIVERSITY, Hsinchu (TW)

(72) Inventors: Tsai-Fu Wu, Hsinchu (TW);
Yen-Hsiang Huang, Hsinchu (TW);
Xin-Ru Huang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 16/932,851

(22) Filed: Jul. 20, 2020

(30) Foreign Application Priority Data

May 6, 2020 (TW) .................................. 109115125

(51) Int. Cl.
*H02M 7/493* (2007.01)
*H02M 1/14* (2006.01)
*H02M 7/5387* (2007.01)
*H02M 7/48* (2007.01)

(52) U.S. Cl.
CPC ........... *H02M 7/493* (2013.01); *H02M 1/143* (2013.01); *H02M 7/53871* (2013.01); *H02M 2007/4822* (2013.01)

(58) Field of Classification Search
CPC ................. H02M 1/143; H02M 7/493; H02M 2007/4822
See application file for complete search history.

(56) References Cited

U.S. PATENT DOCUMENTS

| | | | |
|---|---|---|---|
| 7,518,886 B1 * | 4/2009 | Lai | H02P 8/12 363/17 |
| 8,649,195 B2 * | 2/2014 | Mao | H02M 7/493 363/71 |
| 9,048,726 B1 * | 6/2015 | Tang | H02M 1/12 |
| 9,641,099 B2 * | 5/2017 | Gupta | H02M 7/53871 |
| 10,020,766 B2 * | 7/2018 | Royak | H02M 7/53871 |
| 10,972,016 B2 * | 4/2021 | Gazit | H02M 1/10 |
| 2002/0144163 A1 * | 10/2002 | Goodfellow | H02J 1/102 713/300 |
| 2006/0076907 A1 * | 4/2006 | Chen | H05B 41/245 315/312 |
| 2009/0021081 A1 * | 1/2009 | Jacobson | H02M 7/487 307/77 |

(Continued)

*Primary Examiner* — Yusef A Ahmed
(74) *Attorney, Agent, or Firm* — CKC & Partners Co., LLC

(57) ABSTRACT

A power converting device with a high frequency inverter module compensating a low frequency inverter module is for transmitting a direct current voltage to an alternating current load module. The low frequency inverter module is controlled by a low frequency duty ratio. The high frequency inverter module is connected to the low frequency inverter module in parallel and controlled by a high frequency duty ratio. The low frequency inverter module is controlled according to the low frequency duty ratio to generate a first current. The high frequency duty ratio is adjusted according to a low-frequency ripple current. The high frequency inverter module is controlled according to the high frequency duty ratio to generate a second current, and the second current is for compensating ripples of the first current.

12 Claims, 11 Drawing Sheets

(56) References Cited

U.S. PATENT DOCUMENTS

| | | | | |
|---|---|---|---|---|
| 2012/0224403 A1* | 9/2012 | Wu | ............... | H02M 7/5395 |
| | | | | 363/132 |
| 2013/0201733 A1* | 8/2013 | Divan | ............... | H02M 5/225 |
| | | | | 363/39 |
| 2014/0301124 A1* | 10/2014 | Wu | ............... | H02M 5/14 |
| | | | | 363/132 |
| 2015/0043254 A1* | 2/2015 | Preckwinkel | ............... | F16H 3/60 |
| | | | | 363/41 |
| 2015/0160676 A1* | 6/2015 | Pan | ............... | H02J 3/381 |
| | | | | 307/82 |
| 2015/0214832 A1* | 7/2015 | Tang | ............... | H02M 7/48 |
| | | | | 363/40 |
| 2015/0214854 A1* | 7/2015 | Gu | ............... | H02M 5/4585 |
| | | | | 363/36 |
| 2015/0303830 A1* | 10/2015 | Kang | ............... | H02M 7/493 |
| | | | | 363/71 |
| 2015/0349649 A1* | 12/2015 | Zane | ............... | H02M 1/4241 |
| | | | | 363/21.03 |
| 2016/0065049 A1* | 3/2016 | Wu | ............... | G01R 31/40 |
| | | | | 363/40 |
| 2016/0156291 A1* | 6/2016 | Becker | ............... | H02M 7/493 |
| | | | | 318/400.26 |
| 2016/0372926 A1* | 12/2016 | Pahlevaninezhad | ............... | H02J 3/386 |
| 2017/0104423 A1* | 4/2017 | Wu | ............... | H02M 7/53875 |
| 2017/0133947 A1* | 5/2017 | Fu | ............... | H02M 7/537 |
| 2018/0138805 A1* | 5/2018 | Wu | ............... | H02M 7/493 |
| 2019/0363644 A1* | 11/2019 | Li | ............... | H02M 7/5387 |

* cited by examiner

POWER CONVERTING DEVICE AND METHOD WITH HIGH-FREQUENCY INVERTER MODULE COMPENSATING LOW-FREQUENCY INVERTER MODULE

RELATED APPLICATIONS

This application claims priority to Taiwan Application Serial Number 109115125, filed May 6, 2020, which is herein incorporated by reference.

BACKGROUND

Technical Field

The present disclosure relates to a power converting device and a method with a high-frequency inverter module compensating a low-frequency inverter module. More particularly, the present disclosure relates to a power converting device and a method applied to an uninterruptible power system with a high-frequency inverter module compensating a low-frequency inverter module.

Description of Related Art

In modern times, natural resources are becoming scarce, electricity demand is increasing, and non-sustainable power generating methods such as nuclear power and fossil fuel power have caused many environmental problems. The development of sustainable green energy has become an international trend which is driving the rapid development of distributed generation and power electronics. Most green energy converting devices operate on a grid for improving the stability of the distributed generation system. When a problem occurs on the grid side, how to maintain the energy of the distributed generation system and give the load energy in time until the grid restores stability requires the assistance of uninterruptible power system (UPS).

Owing to the improvement of the power of the inverters, a high-frequency LC filter, a hybrid active filter, or a parallel interleaved inverter is used to reduce the ripples and to increase the dynamical response. In the grid-connected inverter system, the high-frequency LC filter can form a short closed circuit in a specific frequency through the resonance, which can prevent the ripples from introduced into the electrical grid, but the resonance frequency and the stable period is not easy to be decided. The active power filter and the hybrid active filter can detect the virtual work and the harmonics to calculate the switching duty ratio. Although the dynamic response and the virtual work can be compensated, the ripples still exist. The parallel interleaved inverter can improve the dynamic response and decrease the ripples, but the ripples elimination is limited by the parallel number. The common disadvantage of the above mentioned system is that the size of the iron core of the inductor as well as the inductance needs to be increased in order to remove the ripples. Besides, the inductance of the inductor will decrease along with the increase of the current, as a result, the real size of the iron core and the inductance should be larger than the theoretic value in order to reserve the decay range of the inductance. Therefore, the dynamic response will decrease if the inductance increases.

Because the cost of the high-power and high-speed switching elements is high, low-speed switching elements are adapted in the high-power inverter in order to reduce the cost. As a result, the dynamic response is limited by the maximum switching frequency of the switching elements. Moreover, even if the inductance of the filter is the same, the ripples will increase if the switching frequency of the switching elements is lower. Hence, the requirement of the inductance of the inductor and the corresponding cost, size and weight are higher. Therefore, how to efficiently reduce the ripples and cost becomes a pursuit target for practitioners.

SUMMARY

According to an embodiment of the present disclosure, a power converting device with a high-frequency inverter module compensating a low-frequency inverter module is for transmitting a direct current voltage to an alternating current load module. The power converting device with the high-frequency inverter module compensating the low-frequency inverter module includes the low-frequency inverter module and the high-frequency inverter module. The low-frequency inverter module is controlled by a low-frequency duty ratio and includes a first inputting end and a first outputting end. The first inputting end is electrically connected to the direct current voltage, the first outputting end outputs a first current, and the first current includes a low-frequency ripple current. The high-frequency inverter module is connected to the low-frequency inverter module in parallel and controlled by a high-frequency duty ratio. The high-frequency inverter module includes a second inputting end and a second outputting end. The second inputting end is electrically connected to the direct current voltage, and the second outputting end outputs a second current. The low-frequency inverter module is controlled according to the low-frequency duty ratio to generate the first current. The high-frequency duty ratio is adjusted according to the low-frequency ripple current, and the high-frequency inverter module is controlled according to the high-frequency duty ratio to generate the second current. The second current is for compensating ripples of the first current, the first current and the second current are transmitted to a filter module, and the filter module outputs a load current to the alternating current load module.

According to another embodiment of the present disclosure, a power converting method with a high-frequency inverter module compensating a low-frequency inverter module is for transmitting a direct current voltage to an alternating current load module. The power converting method with the high-frequency inverter module compensating the low-frequency inverter module includes a controlling step, an adjusting step and a compensating step. The controlling step is performed to provide a low-frequency duty ratio to control a low-frequency inverter module so as to enable the direct current voltage to generate a first current through the low-frequency inverter module, and the first current includes a low-frequency ripple current. The controlling step is performed to provide a high-frequency duty ratio to control a high-frequency inverter module so as to enable the direct current voltage to generate a second current through the high-frequency inverter module. The adjusting step is performed to provide the low-frequency ripple current to adjust the high-frequency duty ratio, and the high-frequency inverter module is controlled to output the second current according to the high-frequency duty ratio. The compensating step is performed to provide the second current to compensate the low-frequency ripple current of the first current, and the first current and the second current are transmitted to the alternating current load module through a filter module.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
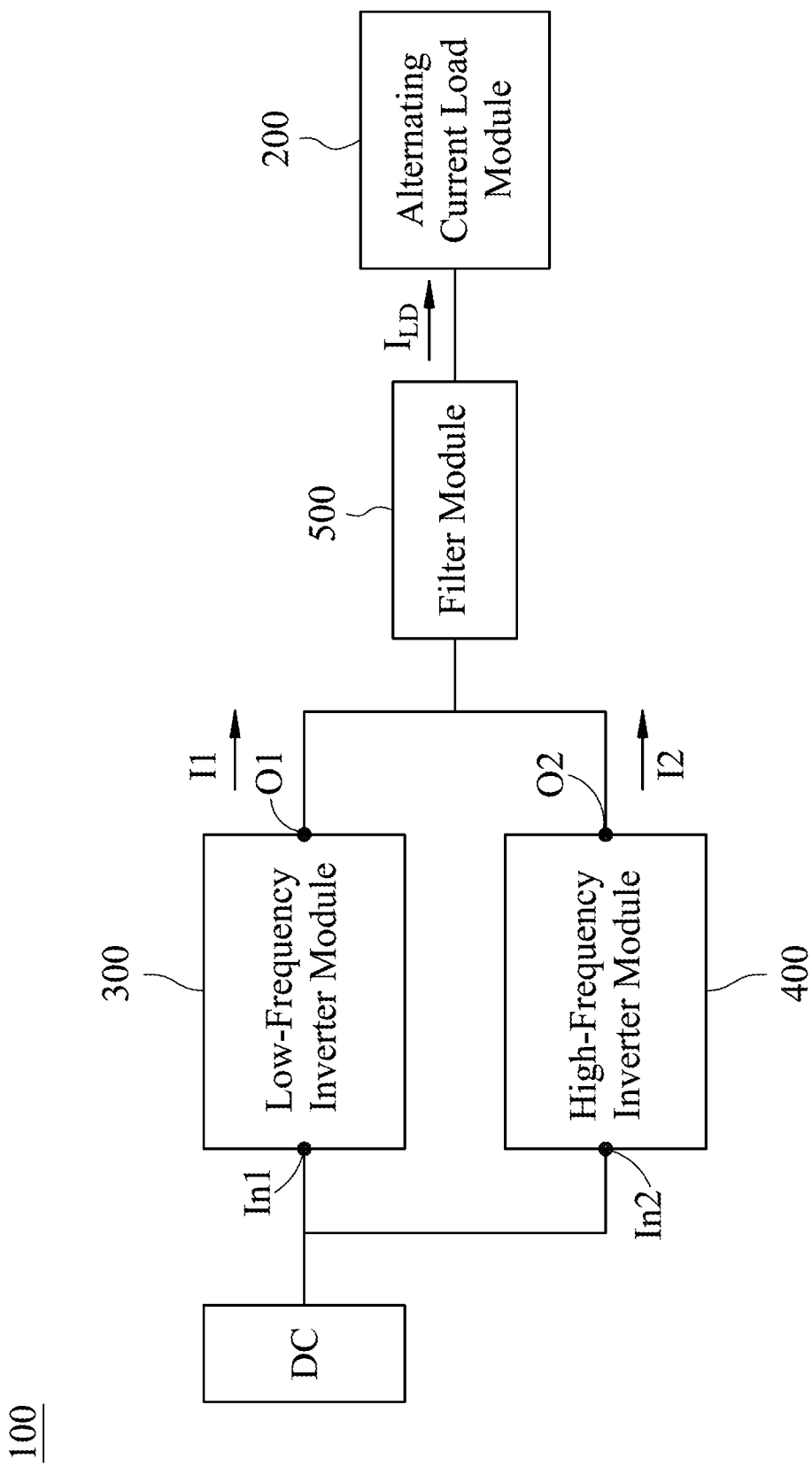
FIG. 1 is a block diagram of a power converting device with a high-frequency inverter module compensating a low-frequency inverter module according to an embodiment of a structural aspect of the present disclosure.

FIG. 1 is a block diagram of a power converting device 100 with a high-frequency inverter module 400 compensating a low-frequency inverter module 300 according to an embodiment of a structural aspect of the present disclosure. In FIG. 1, the power converting device 100 with the high-frequency inverter module 400 compensating the low-frequency inverter module 300 is for transmitting a direct current voltage DC to an alternating current load module 200. The power converting device 100 with the high-frequency inverter module 400 compensating the low-frequency inverter module 300 includes the low-frequency inverter module 300 and the high-frequency inverter module 400. The low-frequency inverter module 300 is controlled by a low-frequency duty ratio (not shown) and includes a first inputting end In1 and a first outputting end O1. The first inputting end In1 is electrically connected to the direct current voltage DC. The first outputting end O1 outputs a first current I1, and the first current I1 includes a low-frequency ripple current (not shown). The high-frequency inverter module 400 is connected to the low-frequency inverter module 300 in parallel and controlled by a high-frequency duty ratio (not shown). The high-frequency inverter module 400 includes a second inputting end In2 and a second outputting end O2. The second inputting end In2 is electrically connected to the direct current voltage DC, and the second outputting end O2 outputs a second current I2. The low-frequency inverter module 300 is controlled according to the low-frequency duty ratio to generate the first current I1. The high-frequency duty ratio is adjusted according to the low-frequency ripple current, and the high-frequency inverter module 400 is controlled according to the high-frequency duty ratio to generate the second current I2. The second current I2 is for compensating ripples of the first current I1. The first current I1 and the second current I2 are transmitted to a filter module 500, and the filter module 500 outputs a load current $I_{LD}$ to the alternating current load module 200.

Therefore, the parallel connection of the low-frequency inverter module 300 and the high-frequency inverter module 400 and the ripple compensation technology are used to enable the second current I2 to offset the low-frequency ripple current of the first current I1.

Figure 2:
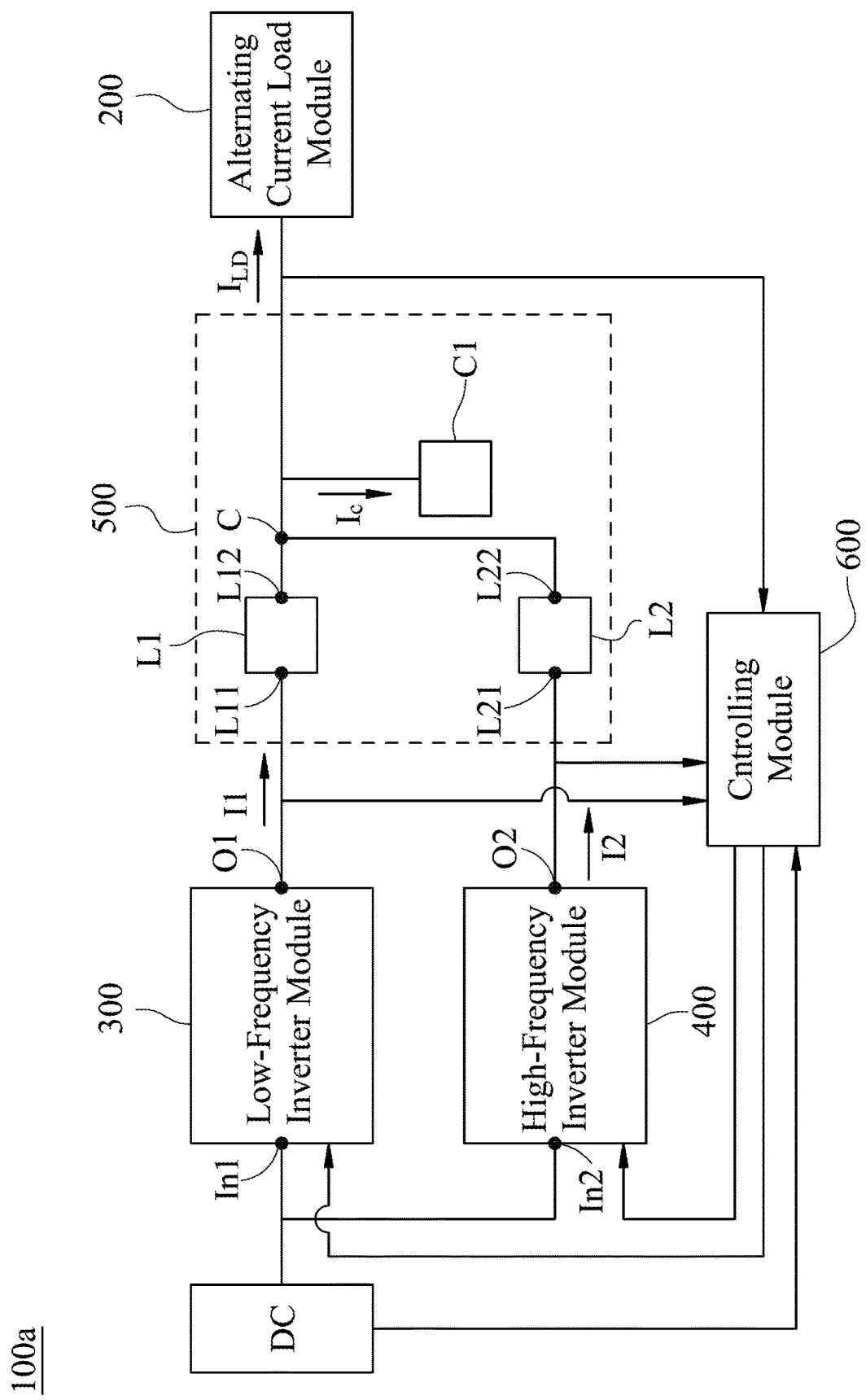
FIG. 2 is a block diagram of the power converting device with the high-frequency inverter module compensating the low-frequency inverter module according to another embodiment of the structural aspect of FIG. 1.

Please refer to FIGS. 1 and 2. FIG. 2 is a block diagram of a power converting device 100a with the high-frequency inverter module 400 compensating the low-frequency inverter module 300 according to another embodiment of the structural aspect of FIG. 1. In FIG. 2, the power converting device 100a with the high-frequency inverter module 400 compensating the low-frequency inverter module 300 can further include a controlling module 600. The controlling module 600 is electrically connected to the low-frequency inverter module 300 and the high-frequency inverter module 400. The low-frequency duty ratio is adjusted by the controlling module 600 according to the first current I1, and the high-frequency duty ratio is also adjusted by the controlling module according to the low-frequency ripple current, so that the low-frequency ripple current of the first current I1 is compensated by the second current I2.

Furthermore, the filter module 500 can have a node C and includes a low-frequency inductor unit L1, a high-frequency inductor unit L2, and an outputting capacitor unit C1. The low-frequency inductor unit L1 has a first end L11 and a second end L12. The first end L11 of the low-frequency inductor unit L1 is electrically connected to the first outputting end O1, and the first current I1 passes through the low-frequency inductor unit L1. The high-frequency inductor unit L2 has a first end L21 and a second end L22. The first end L21 of the high-frequency inductor unit L2 is electrically connected to the second outputting end O2. The second end L22 of the high-frequency inductor unit L2 and the second end L12 of the low-frequency inductor unit L1 is coupled to the node C, and the second current I2 passes through the high-frequency inductor unit L2. The outputting capacitor unit C1 is electrically connected to the node C and generates an outputting capacitor current $I_C$ through the outputting capacitor unit C1, and the node C is electrically connected to the alternating current load module 200.

Figure 3:
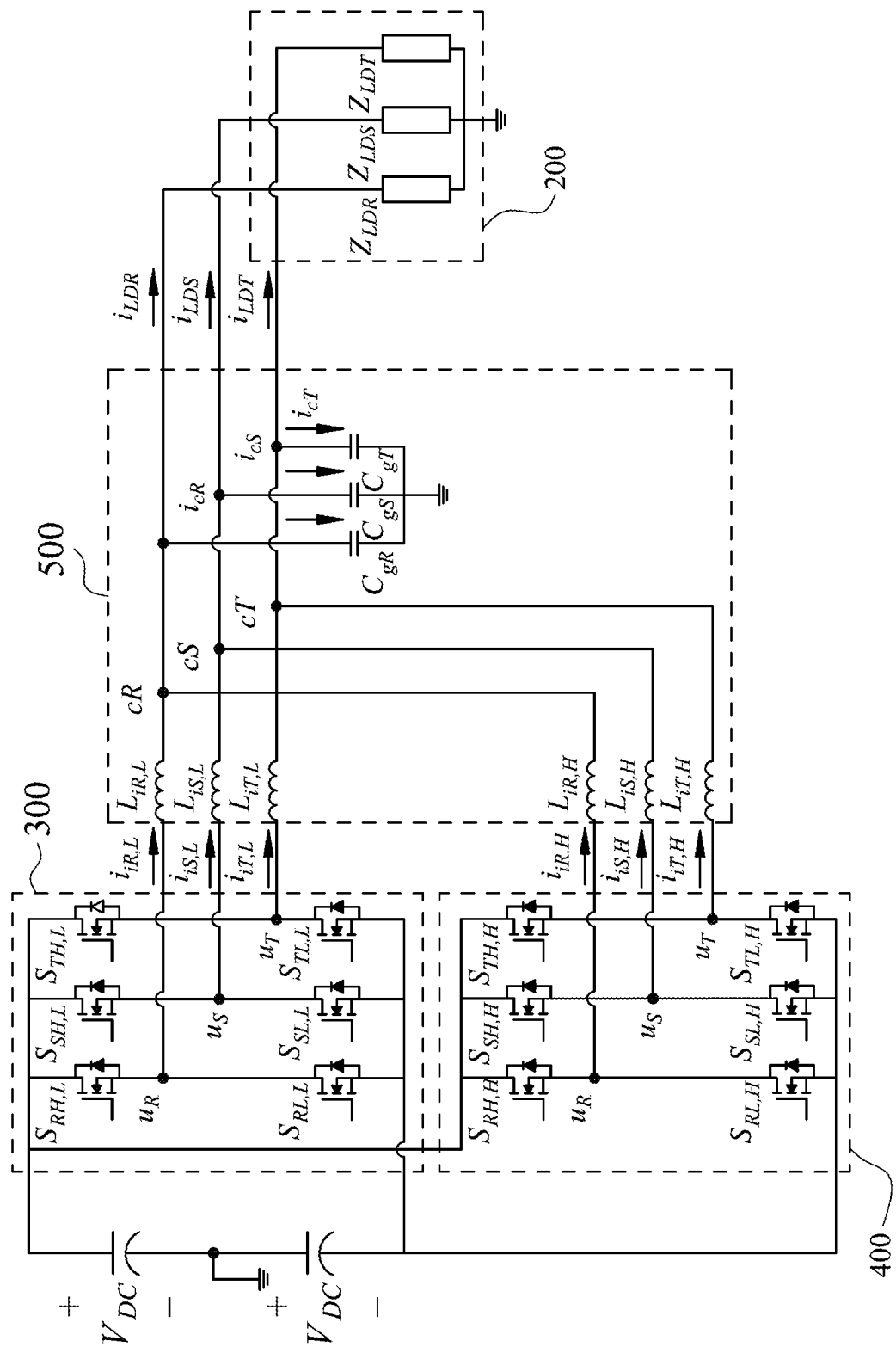
FIG. 3 is a schematic circuit diagram of the power converting device with the high-frequency inverter module compensating the low-frequency inverter module according to the embodiment of FIG. 2.

Please refer to FIGS. 1 to 3. FIG. 3 is a schematic circuit diagram of the power converting device 100a with the high-frequency inverter module 400 compensating the low-frequency inverter module 300 according to the embodiment of FIG. 2. In FIG. 3, the power converting device 100a with the high-frequency inverter module 400 compensating the low-frequency inverter module 300 can be a three-phase converter circuit for converting a DC voltage $V_{DC}$ into a three-phase AC voltage (not shown) and generating a plurality of load currents $i_{LDR}$, $i_{LDS}$, $i_{LDT}$ to a plurality of loads $Z_{LDR}$, $Z_{LDS}$, $Z_{LDT}$ in the alternating current load module 200. In detail, the low-frequency inverter module 300 can be a three-phase four-wire half-bridge architecture and can include a plurality of low-frequency switching components $S_{RH,L}$, $S_{SH,L}$, $S_{TH,L}$, $S_{RL,L}$, $S_{SL,L}$, $S_{TL,L}$ which can be controlled by a pulse width modulation (PWM) signal of the controlling module 600 to open and close, so that the first outputting end O1 outputs the first current I1. The high-frequency inverter module 400 can also be a three-phase four-wire half-bridge architecture and can include a plurality of high-frequency switching components $S_{RH,H}$, $S_{SH,H}$, $S_{TH,H}$, $S_{RL,H}$, $S_{SL,H}$, $S_{TL,H}$, which can also be controlled by another PWM signal of the controlling module 600 to open and close, and PWM is a conventional art, so it is not described in detail.

Furthermore, the first outputting end O1 of the low-frequency inverter module 300 can include a first phase outputting end $u_R$, a second phase outputting end $u_S$, and a third phase outputting end $u_T$, wherein the first phase outputting end $u_R$ outputs a first phase current $i_{iR,L}$, the second phase outputting end $u_S$ outputs a second phase current $i_{iS,L}$, and the third phase outputting end $U_T$ outputs a third phase current $i_{iT,L}$. The first phase current $i_{iR,L}$, the second phase current $i_{iS,L}$ and the third phase current $i_{iT,L}$ of the first outputting end O1 are collectively referred to as the first current I1. The second outputting end O2 of the high-frequency inverter module 400 can include a first phase outputting end $U_R$, a second phase outputting end $U_S$, and a third phase outputting end $U_T$, wherein the first phase outputting end $U_R$ outputs a first phase current $i_{iR,H}$, the second phase outputting end $u_S$ outputs a second phase current $i_{iS,H}$, and the third phase outputting end $U_T$ outputs a third phase current $i_{iT,H}$. The first phase current $i_{iR,H}$ the second phase current $i_{iS,H}$ and the third phase current $i_{iT,H}$ of the second outputting end O2 are collectively referred to as the second current I2.

Moreover, in FIGS. 2 and 3, the low-frequency inductor unit L1 can include a plurality of low-frequency inductors $i_{iR,L}$, $i_{iS,L}$, $i_{iT,L}$. The first phase current $i_{iR,L}$, the second phase current $i_{iS,L}$ and the third phase current $i_{iT,L}$ of the first outputting end O1 flow into the low-frequency inductors $i_{iR,L}$, $i_{iS,L}$, $i_{iT,L}$, respectively. Similarly, the high-frequency inductor unit L2 can include a plurality of high-frequency inductors $L_{iR,H}$, $L_{iS,H}$, $L_{iT,H}$. The first phase current $i_{iR,H}$, the second phase current $i_{iS,H}$ and the third phase current $i_{iT,H}$ of the second outputting end O2 flow into the high-frequency inductors $L_{iR,H}$, $L_{iS,H}$, $L_{iT,H}$, respectively. The low-frequency inductors $L_{iR,L}$, $L_{iS,L}$, $L_{iT,L}$ and the high-frequency inductors $L_{iR,H}$, $L_{iS,H}$, $L_{iT,H}$, are coupled to each other on a plurality of nodes cR, cS, cT, respectively. The outputting capacitor unit C1 can include a plurality of outputting capacitors $C_{gR}$, $C_{gS}$, $C_{gT}$, which are electrically connected to the nodes cR, cS, cT and generate a plurality of outputting capacitor currents $i_{cR}$, $i_{cS}$, $i_{cT}$ through the outputting capacitors $C_{gR}$, $C_{gS}$, $C_{gT}$, respectively. Finally the loads $Z_{LDR}$, $Z_{LDS}$, $Z_{LDT}$ are electrically connected to the nodes cR, cS, cT and generate the load currents $i_{LDR}$, $i_{LDS}$, $i_{LDT}$, respectively.

Figure 4:
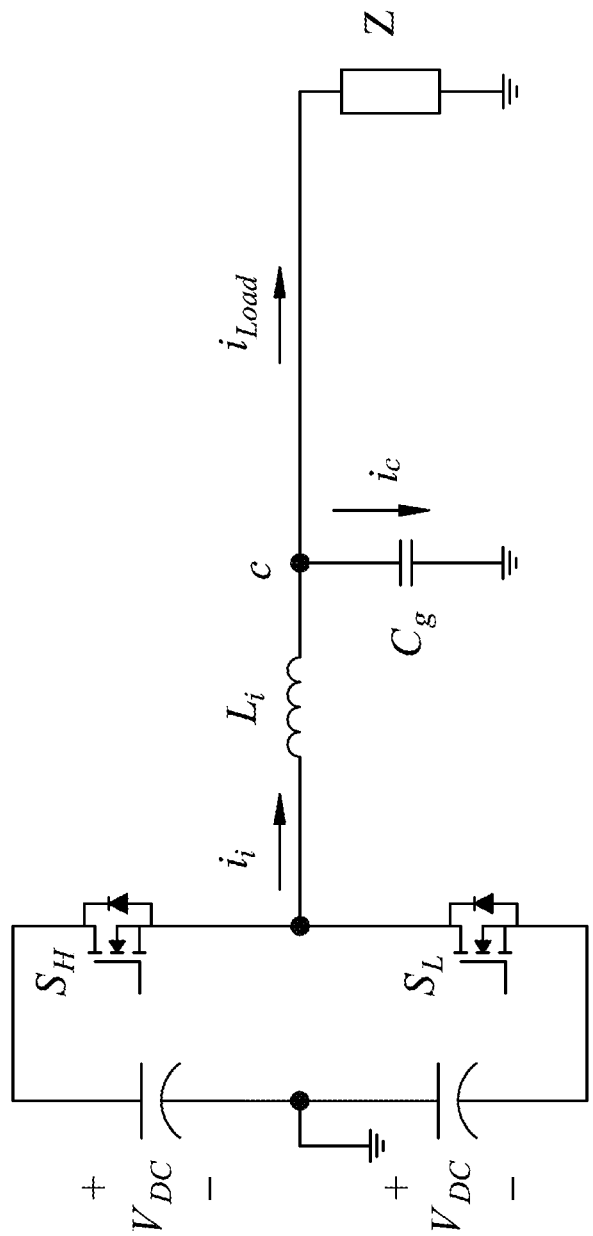
FIG. 4 is a schematic circuit diagram of a single-phase half-bridge converter of the power converting device with the high-frequency inverter module compensating the low-frequency inverter module of FIG. 3.
Figure 5:
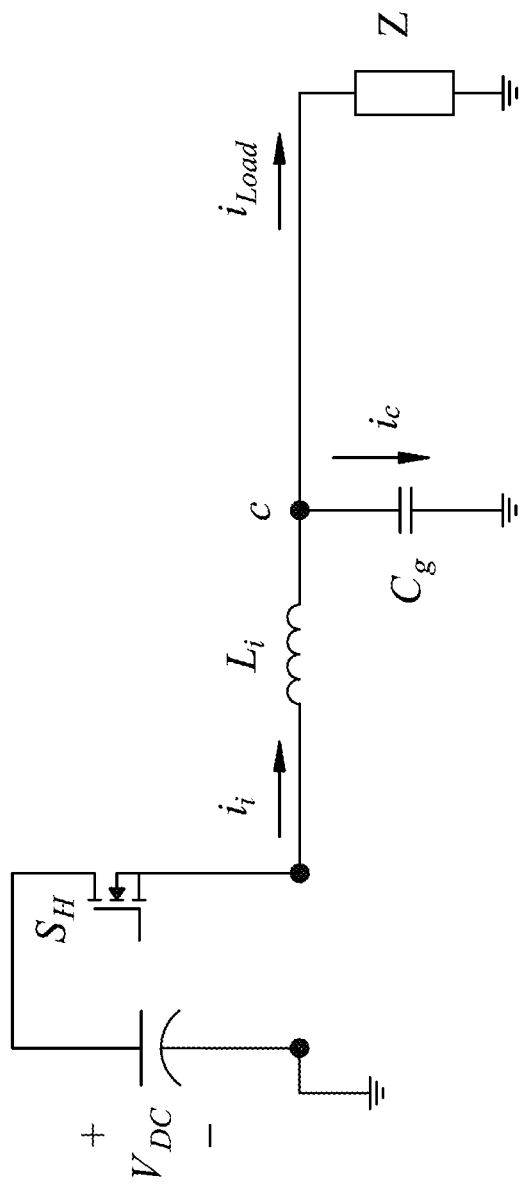
FIG. 5 is a schematic circuit diagram of the single-phase half-bridge converter with a magnetizing inductance according to the embodiment of FIG. 4.
Figure 6:
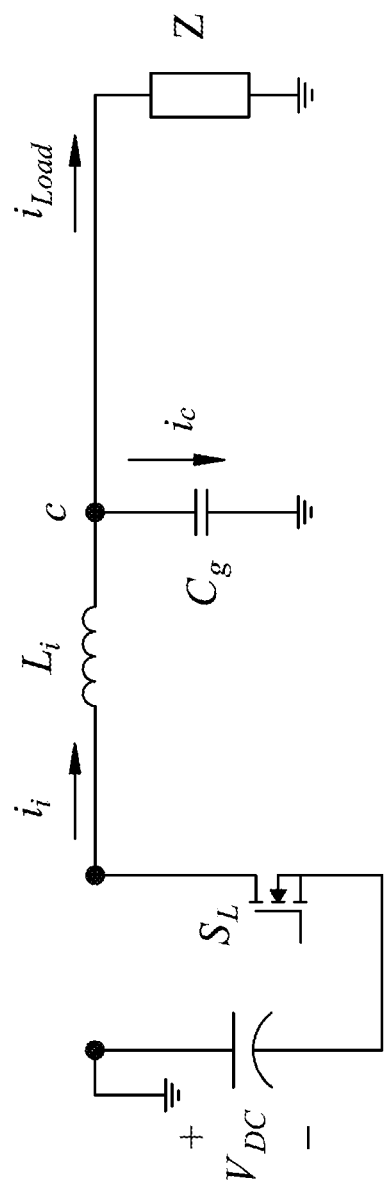
FIG. 6 is a schematic circuit diagram of the single-phase half-bridge converter with a demagnetizing inductance according to the embodiment of FIG. 4.

Please refer to FIGS. 3 to 6. FIG. 4 is a schematic circuit diagram of a single-phase half-bridge converter (its reference numeral is omitted) of the power converting device 100a with the high-frequency inverter module 400 compensating the low-frequency inverter module 300 of FIG. 3. FIG. 5 is a schematic circuit diagram of the single-phase half-bridge converter with a magnetizing inductance according to the embodiment of FIG. 4. FIG. 6 is a schematic circuit diagram of the single-phase haft-bridge converter with a demagnetizing inductance according to the embodiment of FIG. 4. In FIGS. 3 to 6, the low-frequency inverter module 300 and the high-frequency inverter module 400 of the present disclosure are both a three-phase four-wire half-bridge architecture, which can be applied to a division-summation digital control method (D-Σ Digital Control Method). In detail, the three-phase four-wire half-bridge architecture of FIG. 3 can be equivalent to three groups of single-phase half-bridge architecture of FIG. 4. In FIG. 4, $S_H$ and $S_L$ are both a switching element, and $i_i$ is an inductor current. $L_i$ is an inductor, and c is a node and has a capacitor voltage $v_c$. $C_g$ is a capacitor and has a capacitor current $i_c$ and outputs a load current $i_{Load}$ to a load Z, and the magnetizing inductance equation and the demagnetizing inductance equation of the inductor $L_i$ are derived according to Kirchhoff's Voltage Law (KVL), which are represented as the following equations (1) and (2):

$$-V_{DC} + L_i \frac{\Delta i_{mag}}{DT_s} + v_c; \qquad (1)$$

$$-V_{DC} - L_i \frac{\Delta i_{demag}}{(1-D)T_s} - v_c = 0. \qquad (2)$$

Where D is a duty ratio, $T_s$ is a sampling period, $\Delta i_{mag}$ is a current variation of the magnetizing inductance of the inductor $L_i$, and $\Delta i_{demag}$ is a current variation of the demagnetizing inductance the inductor $L_i$. The equation (1) is added to the equation (2) to obtain a total current variation of inductor $L_i$, which is represented as the following equation (3):

$$\Delta i = \Delta i_{mag} + \Delta i_{demag} = \frac{T_s}{L_i}(2V_{DC}D - V_{DC} - v_c). \qquad (3)$$

The duty ratio of the equation (3) is shifted and sorted to obtain an equation of the duty ratio, which is represented as the following equation (4):

$$D = \frac{1}{2} + \frac{L_i \Delta i}{2V_{DC} T_s} + \frac{v_c}{2V_{DC}}. \qquad (4)$$

The equation (4) is converted to a discretized equation, which is represented as the following equation (5):

$$D[n+1] = \frac{1}{2} + \frac{L_i[n]\Delta i[n+1]}{2V_{DC}[n]T_S} + \frac{v_c[n]}{2V_{DC}[n]}. \quad (5)$$

Where the term of $\Delta i$ is a switching current error in n+1 period, but the sampling frequency on the system is several times higher than the measuring frequency on the target, the term of $\Delta i$ can be linearly approximated as the switching current error in n period, and the term of $\Delta i$ is defined as a reference current in n+1 period minus a inductor feedback current in n period, which is represented as the following equation (6):

$$\Delta i[n+1] = \Delta i[n] = i_{ref}[n+1] - i_{i,fb}[n] \quad (6).$$

Where $i_{ref}$ is the reference current in n+1 period and can be expressed as the sum of an outputting capacitor current $i_{cf}$ and a load current $i_{LD}$, and the equation (6) is converted into the following equation (7):

$$\Delta i[n+1] = \{i_{cf}[n+1] + i_{LD}[n+1]\} - i_{i,fb}[n] \quad (7).$$

In FIGS. 2 and 3, the controlling module 600 controls the low-frequency inverter module 300 to operate at a low switching frequency (for example: 6 KHz) and generates a low-frequency switching current error (not shown) according to the low switching frequency. The controlling module 600 adjusts the low-frequency duty ratio according to the low-frequency switching current error so as to enable the first outputting end O1 of the low-frequency inverter module 300 to output the first current I1, that is, the first phase outputting end $u_R$ of the low-frequency inverter module 300 outputs the first phase current $i_{iR,L}$. The second phase outputting end $u_S$ outputs the second phase current $i_{iS,L}$, and the third phase outputting end $u_T$ outputs the third phase current $i_{iT,L}$.

More detail, using the D-Σ Digital Control Method derived from the aforementioned three-phase independent characteristics, the low-frequency duty ratio and the low-frequency switching current error can be derived from equation (5) and equation (7) to obtain the following equations (8) and (9):

$$D_{k,L}[n+1] = \frac{1}{2} + \frac{L_{ik,L,T_L}[n]\Delta i_{k,L}[n+1]}{2V_{DC,T_L}[n]T_{s,L}} + \frac{v_{ck,T_L}[n]}{2V_{DC,T_L}[n]}; \quad (8)$$

$$\Delta i_{k,L}[n+1] = i_{cf,L,T_L}[n+1] + i_{LD,L,T_L}[n+1] - i_{ik,L,T_L}[n]. \quad (9)$$

Where $D_{k,L}$ is the low-frequency duty ratio, and $L_{ik,L,T_L}$ is a low-frequency inductance of the low-frequency inductor unit L1. $\Delta i_{k,L}$ is a low-frequency switching current error of the low-frequency inverter module 300, and $V_{DC,T_L}$ is the direct current voltage having the low-frequency. $T_{s,L}$ is a low-frequency sampling period (such as a reciprocal of the low switching frequency), and $v_{ck,T_L}$ is an outputting capacitor voltage of the outputting capacitor unit C1. $i_{cf,L,T_L}$ is the outputting capacitor current, $i_{LD,L,T_L}$ is the load current, and $i_{ik,L,T_L}$ is a low-frequency inductor feedback current (that is, the controlling module 600 obtains a feedback current from the low-frequency inductors $L_{iR,L}$, $L_{iS,L}$, $L_{iT,L}$).

Successively, the controlling module 600 controls the high-frequency inverter module 400 to operate at a high switching frequency (for example: 48 KHz) and generates a high-frequency switching current error (not shown) according to the high switching frequency. The controlling module 600 adjusts the high-frequency switching current error according to the low-frequency ripple current of the first current I1 and adjusts the high-frequency duty ratio according to the high-frequency switching current error so as to enable the second outputting end O2 of the high-frequency inverter module 400 to output the second current I2, that is, the first phase outputting end $u_R$ of the high-frequency inverter module 400 outputs the first phase current $i_{iR,H}$. The second phase outputting end $u_s$ outputs the second phase current $i_{iS,H}$, and the third phase outputting end $U_T$ outputs the third phase current $i_{iT,H}$. Therefore, the second current I2 compensates ripples of the first current I1 for eliminating the low-frequency ripple current and improving the dynamic response.

More detail, using the D-Σ Digital Control Method derived from the aforementioned three-phase independent characteristics, the high-frequency duty ratio and the high-frequency switching current error can be derived from equation (5) and equation (7) to obtain the following equations (10) and (11):

$$D_{k,H}[m+1] = \frac{1}{2} + \frac{L_{ik,H,T_H}[m]\Delta i_{k,H}[m+1]}{2V_{DC,T_H}[m]T_{s,H}} + \frac{v_{ck,T_H}[m]}{2V_{DC,T_H}[m]}; \quad (10)$$

$$\Delta i_{k,H}[m+1] = \quad (11)$$
$$i_{cf,H,T_H}[m+1] + i_{LD,H,T_H}[m+1] - i_{ik,H,T_H}[m] - i_{rprefk,T_H}[m+1].$$

Where $D_{k,H}$ is the high-frequency duty ratio, and $L_{ik,H,T_H}$ is a high-frequency inductance of the high-frequency inductor unit L2. $\Delta i_{k,H}$ is a high-frequency switching current error of the high-frequency inverter module 400, and $V_{DC,T_H}$ is the direct current voltage having the high switching frequency. $T_{s,H}$ is a high-frequency sampling period (such as a reciprocal of the low switching frequency), and $v_{ck,T_H}$ is an outputting capacitor voltage of the outputting capacitor unit C1. $i_{cf,H,T_H}$ is the outputting capacitor current, and $i_{LD,H,T_H}$ is the load current. $i_{ik,H,T_H}$ is a high-frequency inductor feedback current (that is, the controlling module 600 obtains a feedback current from the high-frequency inductors $L_{iR,H}$, $L_{iS,H}$, $L_{iT,H}$), and $i_{rprefk,T_H}$ is a ripple compensating current command of the controlling module 600. Therefore, the high-frequency switching current error $\Delta i_{k,H}$ is adjusted according to the ripple compensating current command $i_{rprefk,T_H}$. In other words, the high-frequency duty ratio $D_{k,H}$ is adjusted according to the low-frequency ripple current, so that the second current I2 of the high-frequency inverter module 400 can include a compensating current (not shown), which has the same magnitude and opposite direction as the low-frequency ripple current of the first current I1 for cancelling the low-frequency ripple current.

Particularly, since the low switching frequency is about one-eighth of the high switching frequency, the low-frequency converter module 300 is not allowed to track a variation of the outputting capacitor current $i_{cf,L,T_L}$. In equation (9), the outputting capacitor current $i_{cf,L,T_L}$ can be 0, and in the low switching frequency, the reference current $i_{ref}$ of the equation (7) can be most of the load current $i_{LD}$, and the following equation (12) is obtained:

$$\Delta i_{k,L}[n+1] = 0 + 0.8 * i_{LD,fb,L,T_L}[n] - i_{ik,L,T_L}[n] \quad (12).$$

Since the high-frequency inverter module 400 needs to perform the ripple compensating function, there is an additional ripple compensating current command $i_{rpretk,T_H}$ in the equation (11). Furthermore, in order to allow the high-frequency inverter module 400 to track the variation of the outputting capacitor current $i_{cf,H,T_H}$, the reference current $i_{ref}$ of the equation (7) can be a small part of the load current $i_{LD}$ and "in order to reach a reference sine-wave voltage (for example: 311 V) in n+1 period, which is a theoretical voltage value in n+1 period, the outputting capacitor current $i_{cf,H,T_H}$ that needs to be output in n+1 period", and the equation (11) can be converted into the following equation (13):

$$\Delta i_{k,H}[m+1] = \frac{C_f}{2T_{s,H}}[v_{ref}[m+2] - v_{c,fb,T_H}[m]] + \qquad (13)$$
$$0.2 i_{LD,fb,H,T_H}[m] - i_{ik,H,T_H}[m] - i_{rprefk,T_H}[m+1].$$

Where $C_f$ is an outputting capacitance, and $V_{ref}$ is a reference voltage in the high frequency sampling period. $v_{c,fb,T_H}$ is a reference voltage in the high-frequency sampling period $T_{s,H}$. $v_{c,fb,T_H}$ is an outputting capacitor feedback voltage, and $i_{LD,fb,H,T_H}$ is a load feedback current.

Because the ripple compensation technology needs to track the ripple current of the low-frequency inverter with a frequency much higher than 60 Hz. In the high switching frequency, when the low-frequency ripple in the opposite direction is directly used as the current command, the outputting current is easily distorted so as to reduce the efficiency of the ripple compensation. In order to solve the problem of ripple compensation distortion, the present disclosure obtains the correct ripple compensating current command $i_{rprefk,T_H}$ by the relationship between the derived current command and the inductor current output from the inverter, which is represented as the following equation (14):

$$i_{rprefk,T_H}[m+1] = \qquad (14)$$
$$i_{rpk,H,T_H}\left[m+1+\frac{T_d}{T_{s,H}}\right] - i_{rpk,H,T_H}\left[m+\frac{T_d}{T_{s,H}}\right] + [i_{rpk,H,T_H}[m+1].$$

Where $T_d$ is a system delay time, $i_{rpk,H,T_H}$ is a term of the low-frequency ripple, and in the following, the term $i_{rpk,H,T_H}$ of the low-frequency ripple will be explained in detail.

Figure 7:
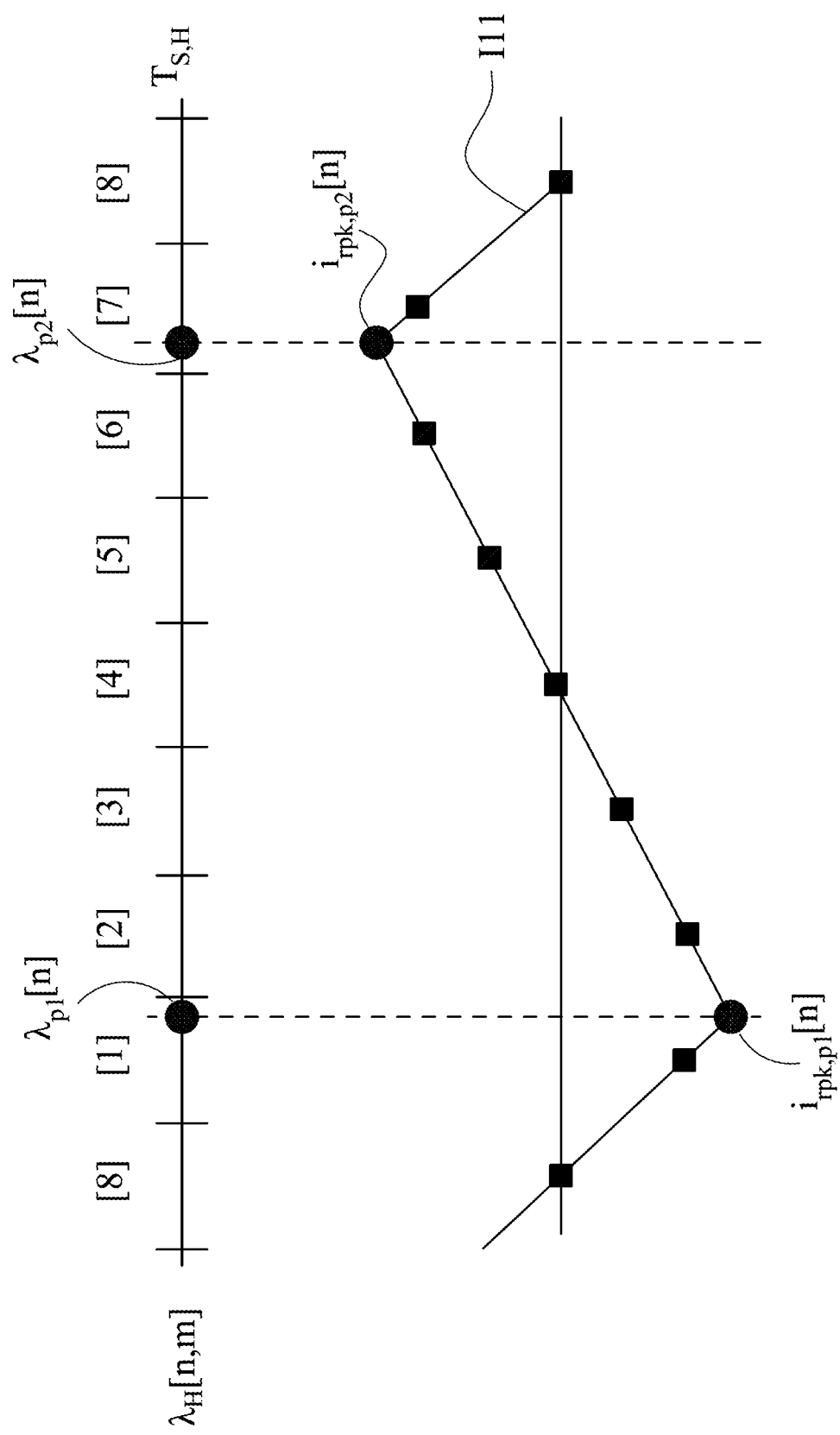
FIG. 7 is a schematic view of the first current sampled by a controlling module according to the embodiment of FIG. 2.

FIG. 7 is a schematic view of the first current sampled by the controlling module 600 according to the embodiment of FIG. 2. In FIG. 7, the controlling module 600 can instantly calculate the low-frequency duty ratio of the low-frequency inverter module 300 in the next period by feeding back the low-frequency ripple current I11 of the first current I1, the known low-frequency duty ratio and the known parameters of the low-frequency inverter module 300. Then, the term $i_{rpk,H,T_H}$ of the low-frequency ripple is calculated from the low-frequency duty ratio and current slopes of the magnetizing inductance and the demagnetizing inductance of the low-frequency inductors $L_{iR,L}$, $L_{iS,L}$, $L_{iT,L}$, which is represented as the following equation (15):

$$i_{rpk,H,T_H}[m] = \begin{cases} i_{rpk,p1}[n] - (\lambda_{p1}[n] - \lambda_H[n,m]) \\ \Delta i_{rpk,H,dem}[n], \lambda_H[n,m] \le \lambda_{p1}[n] \\ i_{rpk,p1}[n] - (\lambda_{p1}[n] - \lambda_H[n,m]) \\ \Delta i_{rpk,H,mag}[n], \lambda_{p1}[n] < \lambda_H[n,m] \le \lambda_{p2}[n] \\ i_{rpk,p2}[n] - (\lambda_{p2}[n] - \lambda_H[n,m]) \\ \Delta i_{rpk,H,dem}[n], \lambda_H[n,m] > \lambda_{p2}[n]. \end{cases} \qquad (15)$$

During the high-frequency sampling period $T_{s,H}$, the variations of the low-frequency ripple current I11 are represented as the following equations (16) and (17):

$$\Delta i_{rpk,H,dem}[n] = \frac{(-V_{DC,T_L}[n] - v_{ck,T_L}[n])}{L_{ik,L,T_L}[n]} T_{sH} - \frac{\Delta i_{k,L}[n]}{2\lambda_{half}}; \qquad (16)$$

$$\Delta i_{rpk,H,mag}[n] = \frac{(V_{DC,T_L}[n] - v_{ck,T_L}[n])}{L_{ik,L,T_L}[n]} T_{sH} - \frac{\Delta i_{k,L}[n]}{2\lambda_{half}}. \qquad (17)$$

In detail, the parameters of the low-frequency inverter module 300 are used to calculate the current slopes of the magnetizing inductance and the demagnetizing inductance of the low-frequency inductors $L_{iR,L}$, $L_{iS,L}$, $L_{iT,L}$, and then multiplied by the high-frequency sampling period $T_{s,H}$ to represent the rising variations (such as the equation (16)) and the falling variations (such as the equation (17)) of the first current I1. However, the ripple compensation only needs to eliminate the pure part of the low-frequency ripple. In order to avoid canceling the part of a low-frequency fundamental wave, the variation $\Delta i_{k,L}$ of the low-frequency fundamental wave needs to be considered. Therefore, the variation that needs to be deducted in the high-frequency sampling period $T_{s,H}$ is a variation $\Delta i_{k,L}$ of the low-frequency fundamental wave divided by a sampling frequency ratio $2\lambda_{half}$ between the high frequency and the low frequency.

More detail, the high-frequency inverter module 400 simulating the first current I1 needs to know the corresponding value $\lambda_H[mm]$ of the low-frequency ripple current I11 in the high-frequency sampling period $T_{s,H}$. For example, turning points $i_{rpk,p1}[n]$, $i_{rpk,p2}[n]$ of the low-frequency ripple current I11 and its corresponding value $\lambda_{p1}[n]$, $\lambda_{p2}[n]$ in the high-frequency sampling period $T_{s,H}$ of the FIG. 7. In other words, to determine which section of the rising variation and the falling variation of the low-frequency ripple current I11 is located in the high-frequency sampling period $T_{s,H}$, the term $i_{rpk,H,T_H}$ of the low-frequency ripple (such as the equation (15)) calculated by the turning points $i_{rpk,p1}[n]$, $i_{rpk,p2}[n]$ and the current slopes of the magnetizing inductance and the demagnetizing inductance of the low-frequency inductors $L_{iR,L}$, $L_{iS,L}$, $L_{iT,L}$ can be used. Therefore, the term $i_{rpk,H,T_H}$ of the low-frequency ripple is added by the controlling module 600 at the high-frequency switching current error, which can effectively eliminate the low-frequency ripple current I11 so as to inhibit the current ripple that increases with the attenuation of the inductance.

Figure 8:
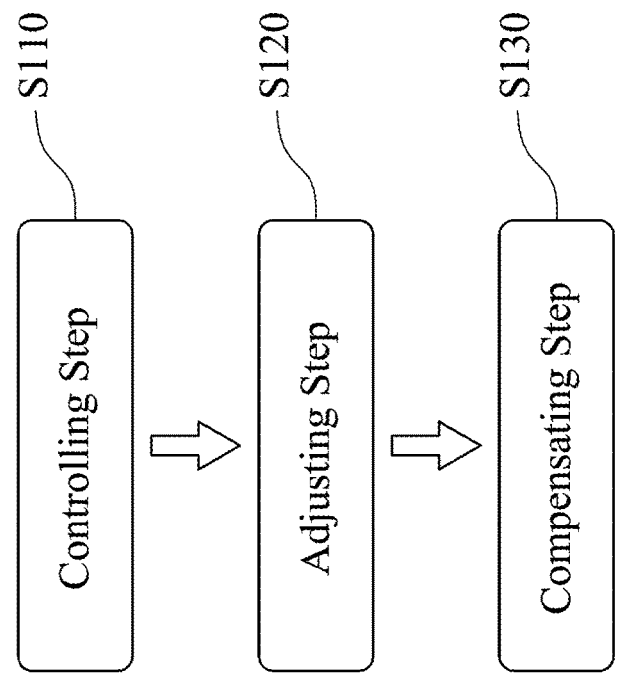
FIG. 8 is a flow chart of a power converting method with the high-frequency inverter module compensating the low-frequency inverter module according to an embodiment of a methodical aspect of the present disclosure.

FIG. 8 is a flow chart of a power converting method S100 with the high-frequency inverter module 400 compensating the low-frequency inverter module 300 according to an embodiment of a methodical aspect of the present disclosure. In FIG. 8, the power converting method S100 with the high-frequency inverter module 400 compensating the low-frequency inverter module 300 includes a controlling step S110, an adjusting step S120 and a compensating step S130.

Please refer to FIGS. 1 to 8. In detail, the power converting method S100 with the high-frequency inverter module 400 compensating the low-frequency inverter module 300 is for transmitting the direct current voltage DC to the alternating current load module 200. The controlling step S110 is performed to provide the low-frequency duty ratio to control the low-frequency inverter module 300 so as to enable the direct current voltage DC to generate the first current I1 through the low-frequency inverter module 300, and the first current I1 includes the low-frequency ripple current I11. The controlling step S110 is also performed to provide the high-frequency duty ratio to control the high-frequency inverter module 400 so as to enable the direct current voltage DC to generate a second current I2 through the high-frequency inverter module 400. The adjusting step S120 is performed to provide the low-frequency ripple current I11 to adjust the high-frequency duty ratio and the high-frequency inverter module 400 is controlled to output the second current I2 according to the high-frequency duty ratio. The compensating step S130 is performed to provide the second current I2 to compensate the low-frequency ripple current I11 of the first current I1, and the first current I1 and the second current I2 are transmitted to the alternating current load module 200 through the filter module 500.

In detail, according to FIG. 8, the adjusting step S120 can provide the controlling module 600 to adjust the low-frequency duty ratio according to the first current I1, the controlling module 600 adjusts the high-frequency duty ratio according to the low-frequency ripple current I11, so that the second current I2 performs ripple compensation on the first current I1. Therefore, the power converting method S100 with the high-frequency inverter module 400 compensating the low-frequency inverter module 300 can enable the second current I2 output from the high-frequency inverter module 400 to offset the low-frequency ripple I11 of the first current I1 by the controlling step S110, the adjusting step S120 and the compensating step S130. As for the equation of the low-frequency duty ratio, the equation can include the low-frequency duty ratio $D_{k,L}$, the low-frequency inductance $L_{ik,L,T_L}$ of the low-frequency inductor unit L1, the low-frequency switching current error $\Delta i_{k,L}$ of the low-frequency inverter module 300, the direct current voltage $V_{DC,T_L}$ having the low switching frequency, the low-frequency sampling period $T_{s,L}$ (such as a reciprocal of the low switching frequency) and the outputting capacitor voltage $v_{ck,T_L}$ of the outputting capacitor unit C1, and the low-frequency duty ratio conforms to the aforementioned equation (8). Furthermore, the equation of the high-frequency duty ratio can include the high-frequency duty ratio $D_{k,H}$, the high-frequency inductance $L_{ik,H,T_H}$ of the high-frequency inductor unit L2, the high-frequency switching current error $\Delta i_{k,H}$ of the high-frequency inverter module 400, the direct current voltage $V_{DC,T_H}$ having the high switching frequency, the high-frequency sampling period $T_{s,H}$ (such as a reciprocal of the high switching frequency) and the outputting capacitor voltage $v_{ck,T_H}$ of the outputting capacitor unit C1, and the high-frequency duty ratio conforms to the aforementioned equation (10).

Figure 9:
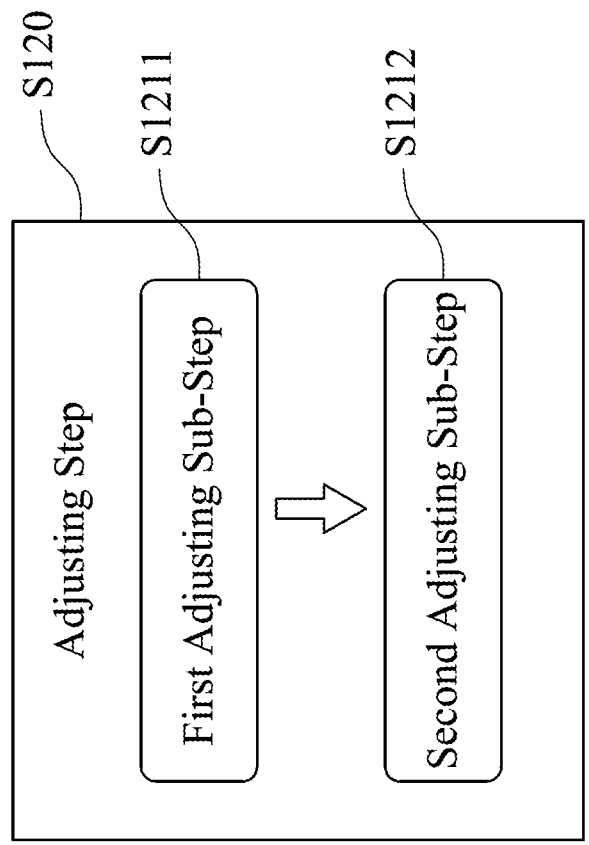
FIG. 9 is a flow chart of an adjusting step according to the power converting method with the high-frequency inverter module compensating the low-frequency inverter module of FIG. 8.

Please refer to FIGS. 1 to 9. FIG. 9 is a flow chart of the adjusting step S120 according to the power converting method S100 with the high-frequency inverter module 400 compensating the low-frequency inverter module 300 of FIG. 8. In FIG. 9, according to the adjusting step S120, the controlling module 600 can control the low-frequency inverter module 300 to operate at the low switching frequency (for example: 6 KHz) and generate the low-frequency switching current error $\Delta i_{k,L}$ according to the low switching frequency. The controlling module 600 can also control the high-frequency inverter module 400 to operate at the high switching frequency (for example: 48 KHz) and generate the high-frequency switching current error $\Delta i_{k,H}$ according to the high switching frequency.

In detail, according to FIG. 9, the adjusting step S120 can include a first adjusting sub-step S1211 and a second adjusting sub-step S1212. The first adjusting sub-step S1211 drives the controlling module 600 to adjust the low-frequency duty ratio $D_{k,L}$ according to the low-frequency switching current error $\Delta i_{k,L}$ so as to enable the low-frequency inverter module 300 to output the first current I1. The second adjusting sub-step S1212 drives the controlling module 600 to adjust the high-frequency switching current error $\Delta i_{k,H}$ according to the low-frequency ripple current I11 and the controlling module 600 adjusts the high-frequency duty ratio $D_{k,H}$ according to the high-frequency switching current error $\Delta i_{k,H}$ so as to enable the high-frequency inverter module 400 to output the second current I2. As for the equation of the low-frequency switching current error $\Delta i_{k,L}$, the equation can include the outputting capacitor current $i_{cf,L,T_L}$, the load current $i_{LD,L,T_L}$ and the low-frequency inductor feedback current $i_{ik,L,T_L}$ (that is, the controlling module 600 obtains a feedback current from the low-frequency inductors $L_{iR,L}$, $L_{iS,L}$, $L_{iT,L}$), and the low-frequency switching current error $\Delta i_{k,L}$ conforms to the aforementioned equation (9). Furthermore, the equation of the high-frequency switching current error $\Delta i_{k,H}$ can include the outputting capacitor current $i_{cf,H,T_H}$, the load current $i_{LD,H,T_H}$ and the high-frequency inductor feedback current $i_{ik,H,T_H}$ (that is, the controlling module 600 obtains a feedback current from the high-frequency inductors $L_{iR,H}$, $L_{iS,H}$, $L_{iT,H}$), and the high-frequency switching current error $\Delta i_{k,H}$ conforms to the aforementioned equation (11).

Particularly, since the low switching frequency is about one-eighth of the high switching frequency, the low-frequency converter module 300 is not allowed to track a variation of the outputting capacitor current $i_{cf,L,T_L}$. In equation (9), the outputting capacitor current $i_{cf,L,T_L}$ can be 0 to obtain the aforementioned equation (12). Further, since the high-frequency inverter module 400 needs to perform the ripple compensating function, there is an additional ripple compensating current command $i_{rprefk,T_H}$ in the equation (11). In order to allow the high-frequency inverter module 400 to track the variation of the outputting capacitor current $i_{cf,H,T_H}$, the high-frequency switching current error $\Delta i_{k,H}$ can include the outputting capacitance $C_f$, the reference voltage $V_{ref}$ in the high-frequency sampling period $T_{s,H}$, and the outputting capacitor feedback voltage $V_{cfb,T_H}$ and the load feedback current $i_{LD,fb,H,T_H}$, and the equation (11) can be converted into the aforementioned equation (13).

Moreover, in order to solve the aforementioned problem of ripple compensation distortion, the present disclosure obtains the correct ripple compensating current command $i_{rprefk,T_H}$ by the relationship between the derived current command and the inductor current output from the inverter. The ripple compensating current command $i_{rprefk,T_H}$ can include system delay time $T_d$, the term of the low-frequency ripple $i_{rpk,H,T_H}$, which is represented as the aforementioned equation (14). Furthermore, the details of the term of the low-frequency ripple $i_{rpk,H,T_H}$ in this embodiment are similar to the term of the low-frequency ripple $i_{rpk,H,T_H}$ described in FIG. 7, and will not be detailedly described herein.

Figure 10:
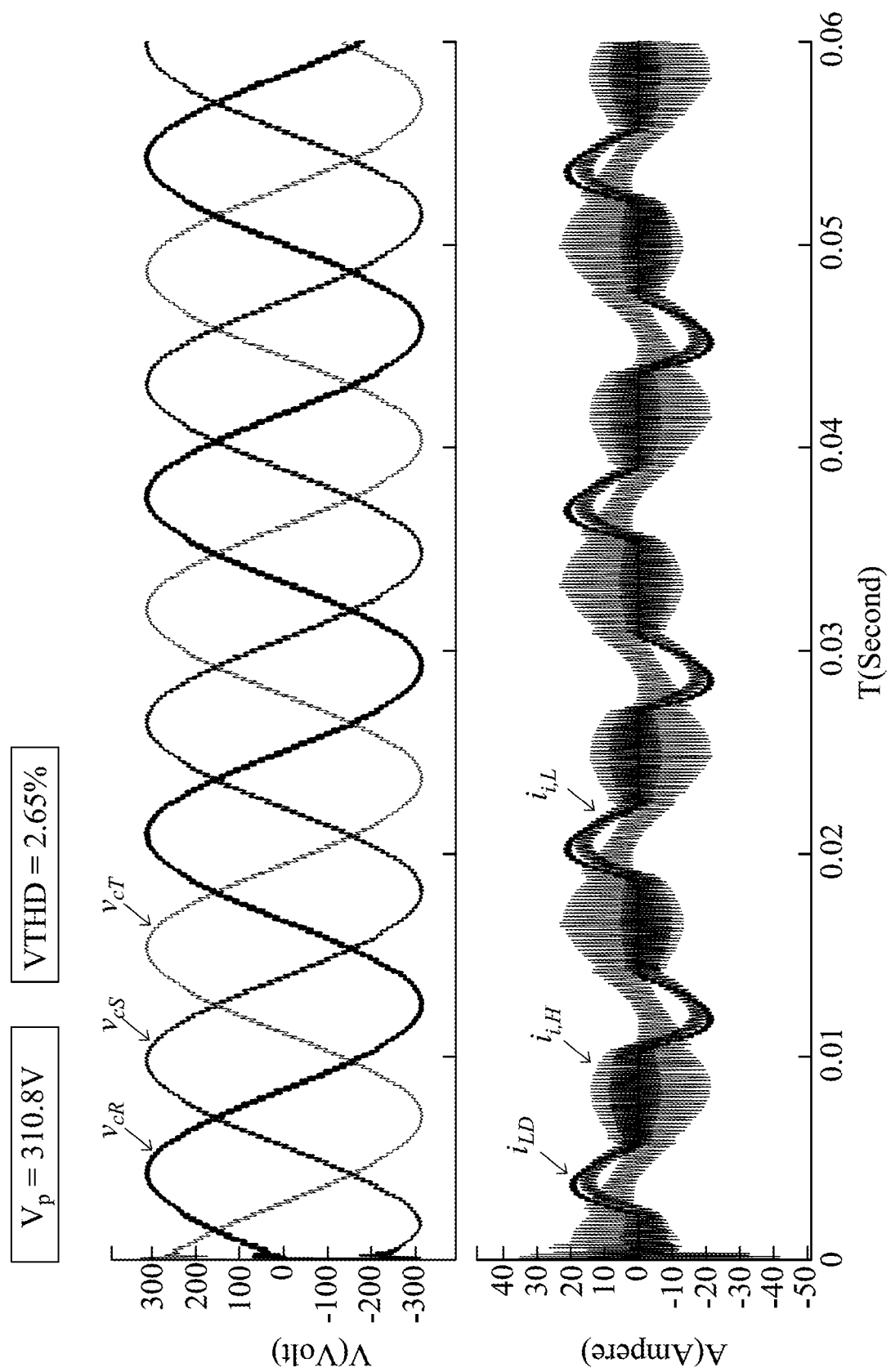
FIG. 10 is a schematic view of an outputting capacitor voltage, a high-frequency inductor current, a low-frequency inductor current and a load current according to the power converting device without ripple compensation of FIG. 3.

FIG. 10 is a schematic view of the outputting capacitor voltage $V_{cR}$, $V_{cS}$, $V_{cT}$, the high-frequency inductor current $i_{i,H}$, the low-frequency inductor current $i_{i,L}$, and the load current $i_{LD}$ according to the power converting device 100a without ripple compensation of FIG. 3. In FIG. 10, according to the UPS mode, the power converting device 100a (10 kW) outputs a peak voltage $V_P$ of the outputting capacitor voltage $v_{cR}$, $V_{cS}$, $V_{cT}$ (such as the voltage of nodes cR, cS, cT in FIG. 3) is 310.8 V, and the total harmonic distortion (THD) is 2.65%. It can be seen from the above that the high-frequency inverter module 400 does not perform accurate and appropriate ripple compensation on the low-frequency inverter module 300.

Figure 11:
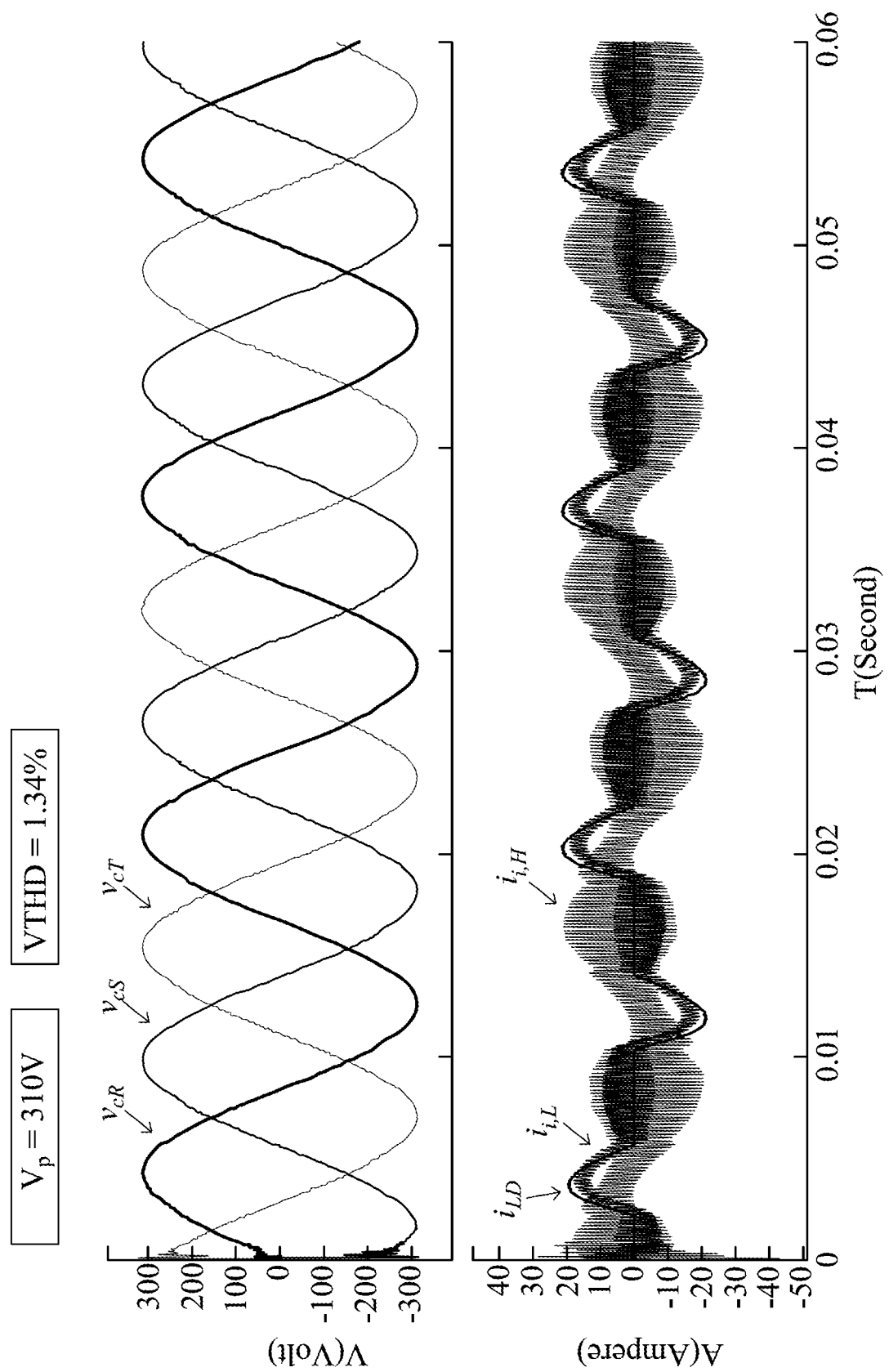
FIG. 11 is a schematic view of the outputting capacitor voltage, the high-frequency inductor current, the low-frequency inductor current and the load current according to the power converting device with ripple compensation of FIG. 3.

Please refer to FIGS. 10 and 11. FIG. 11 is a schematic view of the outputting capacitor voltage $V_{cR}$, $V_{cS}$, $V_{cT}$, the high-frequency inductor current $i_{i,H}$, the low-frequency inductor current $i_{i,L}$, and the load current $i_{LD}$ according to the power converting device 100a with ripple compensation of FIG. 3. After adding the ripple compensating current command $i_{rpre f k, T_H}$ to the high-frequency switching current error $\Delta i_{k,H}$, the high-frequency inverter module 400 outputs the current, which has the same magnitude and opposite direction as the low-frequency ripple current so as to achieve ripple compensation. Therefore, in FIG. 11, each of frequency periods contains 8 high-frequency periods of compensation, the peak voltage $V_p$ of the outputting capacitor voltage $V_{cR}$, $V_{cS}$, $V_{cT}$ is 310 V, and the THD of 1.34%. Further, the peak voltage and the THD of various loads without ripple compensation are summarized in Table 1, the peak voltage and the THD of various loads after ripple compensation are summarized in Table 2, but is not limited to the present disclosure.

TABLE 1

|  | Resistance | Capacitive load | Inductive load | Rectifier load |
|---|---|---|---|---|
| $V_p$ | 309.9 V | 310.9 V | 309.2 V | 310.8 V |
| THD | 2.26% | 2.34% | 2.47% | 2.65% |

TABLE 2

|  | Resistance | Capacitive load | Inductive load | Rectifier load |
|---|---|---|---|---|
| $V_p$ | 309.7 V | 310.7 V | 309 V | 310 V |
| THD | 0.39% | 0.39% | 0.39% | 1.34% |

In summary, the present disclosure has the following advantages: First, it is favorable for eliminating the low-frequency ripple current and improving the dynamic response. Second, it is favorable for inhibit the increase of ripple caused by the decrease of the inductance of the inductor as the current rises. Third, the parameters, volume and weight of the filter can be decreased as the frequency ratio of the power converting device increases. Fourth, the power converting device can also support UPS and reduce the cost of UPS.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power converting device with a high-frequency inverter module compensating a low-frequency inverter module for transmitting a direct current voltage to an alternating current load module, and the power converting device with the high-frequency inverter module compensating the low-frequency inverter module comprising:
   the low-frequency inverter module controlled by a low-frequency duty ratio, wherein the low-frequency inverter module comprises:
      a first inputting end electrically connected to the direct current voltage; and
      a first outputting end outputting a first current, wherein the first current comprises a low-frequency ripple current; and
   the high-frequency inverter module connected to the low-frequency inverter module in parallel and controlled by a high-frequency duty ratio, wherein the high-frequency inverter module comprises:
      a second inputting end electrically connected to the direct current voltage; and
      a second outputting end outputting a second current;
   wherein the low-frequency inverter module is controlled according to the low-frequency duty ratio to generate the first current;
   wherein the high-frequency duty ratio is adjusted according to the low-frequency ripple current, and the high-frequency inverter module is controlled according to the high-frequency duty ratio to generate the second current;
   wherein the second current is for compensating ripples of the first current, the first current and the second current are transmitted to a filter module, and the filter module outputs a load current to the alternating current load module;
   wherein the filter module has a node and comprises:
      a low-frequency inductor unit having a first end and a second end, wherein the first end of the low-frequency inductor unit is electrically connected to the first outputting end, and the first current passes through the low-frequency inductor unit;
      a high-frequency inductor unit having a first end and a second end, wherein the first end of the high-frequency inductor unit is electrically connected to the second outputting end, the second end of the high-frequency inductor unit and the second end of the low-frequency inductor unit are coupled to the node, and the second current passes through the high-frequency inductor unit; and
      an outputting capacitor unit electrically connected to the node and generating an outputting capacitor current through the outputting capacitor unit, wherein the node is electrically connected to the alternating current load module;
   wherein the low-frequency duty ratio is represented as the following equation:

$$D_{k,L}[n+1] = \frac{1}{2} + \frac{L_{ik,L,T_L}[n]\Delta i_{k,L}[n+1]}{2V_{DC,T_L}[n]T_{s,L}} + \frac{v_{ck,T_L}[n]}{2V_{DC,T_L}[n]};$$

wherein $D_{k,L}$ is the low-frequency duty ratio, $L_{ik,L,T_L}$ is a low-frequency inductance of the low-frequency inductor unit, $\Delta i_{k,L}$ is a low-frequency switching current error of the low-frequency inverter module, $V_{DC,T_L}$ is the direct current voltage having a low switching frequency, $T_{s,L}$ is a low-frequency sampling period, n is a given period, and $v_{ck,T_L}$ is an outputting capacitor voltage of the outputting capacitor unit.

2. The power converting device with the high-frequency inverter module compensating the low-frequency inverter module of claim 1, further comprising:
   a controlling module electrically connected to the low-frequency inverter module and the high-frequency inverter module, wherein the low-frequency duty ratio is adjusted by the controlling module according to the first current, the high-frequency duty ratio is adjusted by the controlling module according to the low-frequency ripple current, and the low-frequency ripple current of the first current is compensated by the second current.

3. The power converting device with the high-frequency inverter module compensating the low-frequency inverter module of claim 2, wherein,
the controlling module controls the low-frequency inverter module to operate at a low switching frequency and generates a low-frequency switching current error according to the low switching frequency; and
the controlling module adjusts the low-frequency duty ratio according to the low-frequency switching current error so as to enable the first outputting end to output the first current.

4. The power converting device with the high-frequency inverter module compensating the low-frequency inverter module of claim 2, wherein,
the controlling module controls the high-frequency inverter module to operate at a high switching frequency and generates a high-frequency switching current error according to the high switching frequency; and
the controlling module adjusts the high-frequency switching current error according to the low-frequency ripple current and adjusts the high-frequency duty ratio according to the high-frequency switching current error so as to enable the second outputting end to output the second current.

5. The power converting device with the high-frequency inverter module compensating the low-frequency inverter module of claim 1, wherein the low-frequency switching current error is represented as the following equation:

$$\Delta i_{k,L}[n+1]=i_{cf,L,T_L}[n+1]+i_{LD,L,T_L}[n+1]-i_{ik,L,T_L}[n];$$

wherein $\Delta_{i,K,L}$ is the low-frequency switching current error, $i_{cf,L,T_L}$ is the outputting capacitor current, $i_{LD,L,T_L}$ is the load current, and $i_{ik,L,T_L}$ is a low-frequency inductor feedback current.

6. The power converting device with the high-frequency inverter module compensating the low-frequency inverter module of claim 1, wherein the high-frequency duty ratio is represented as the following equation:

$$D_{k,H}[m+1] = \frac{1}{2} + \frac{L_{ik,H,T_H}[m]\Delta i_{k,H}[m+1]}{2V_{DC,T_H}[m]T_{s,H}} + \frac{v_{ck,T_H}[m]}{2V_{DC,T_H}[m]};$$

wherein $D_{k,H}$ is the high-frequency duty ratio, $L_{ik,H,T_H}$ is a high-frequency inductance of the high-frequency inductor unit, $\Delta i_{k,H}$ is a high-frequency switching current error of the high-frequency inverter module, $V_{DC,T_H}$ is the direct current voltage having a high switching frequency, $T_{s,H}$ is a high-frequency sampling period, m is another given period, and $v_{ck,T_H}$ is an outputting capacitor voltage of the outputting capacitor unit.

7. The power converting device with the high-frequency inverter module compensating the low-frequency inverter module of claim 6, wherein the high-frequency switching current error is represented as the following equation:

$$\Delta i_{k,H}[m+1]=i_{cf,H,T_H}[m+1]i_{LD,H,T_H}[m+1]-i_{ik,H,T_H}[m]-i_{rpref,k,T_H}[m+1];$$

wherein $\Delta i_{k,H}$ is the high-frequency switching current error, $i_{cf,H,T_H}$ is the outputting capacitor current, $i_{LD,H,T_H}$ is the load current, $i_{ik,H,T_H}$ is a high-frequency inductor feedback current, and $i_{rpref,k,T_H}$ is a ripple compensating current command.

8. A power converting method with a high-frequency inverter module compensating a low-frequency inverter module for transmitting a direct current voltage to an alternating current load module, and the power converting method with the high-frequency inverter module compensating the low-frequency inverter module comprising:
a controlling step, comprising:
providing a low-frequency duty ratio to control the low-frequency inverter module so as to enable the direct current voltage to generate a first current through the low-frequency inverter module, wherein the first current comprises a low-frequency ripple current; and
providing a high-frequency duty ratio to control the high-frequency inverter module so as to enable the direct current voltage to generate a second current through the high-frequency inverter module;
an adjusting step, comprising:
providing the low-frequency ripple current to adjust the high-frequency duty ratio, wherein the high-frequency inverter module is controlled to output the second current according to the high-frequency duty ratio;
providing a controlling module to adjust the low-frequency duty ratio according to the first current;
providing the controlling module to adjust the high-frequency duty ratio according to the low-frequency ripple current, wherein the second current performs ripple compensation on the first current;
providing the controlling module to control the low-frequency inverter module to operate at a low switching frequency and generate a low-frequency switching current error according to the low switching frequency; and
providing the controlling module to control the high-frequency inverter module to operate at a high switching frequency and generate a high-frequency switching current error according to the high switching frequency; and
a compensating step providing the second current to compensate the low-frequency ripple current of the first current, wherein the first current and the second current are transmitted to the alternating current load module through a filter module;
wherein the low-frequency duty ratio is represented as the following equation:

$$D_{k,L}[n+1] = \frac{1}{2} + \frac{L_{ik,L,T_L}[n]\Delta i_{k,L}[n+1]}{2V_{DC,T_L}[n]T_{s,L}} + \frac{v_{ck,T_L}[n]}{2V_{DC,T_L}[n]};$$

wherein $D_{k,L}$ is the low-frequency duty ratio, $L_{jk,L,T_L}$ is a low-frequency inductance, $\Delta i_{k,L}$ is the low-frequency switching current error of the low-frequency inverter module, $V_{DC,T_L}$ is the direct current voltage having a low switching frequency, $T_{s,L}$ is a low-frequency sampling period, n is a given period, and $v_{ck,T_L}$ is an outputting capacitor voltage.

9. The power converting method with the high-frequency inverter module compensating the low-frequency inverter module of claim 8, wherein the adjusting step comprises,
a first adjusting sub-step driving the controlling module to adjust the low-frequency duty ratio according to the low-frequency switching current error so as to enable the low-frequency inverter module to output the first current; and a second adjusting sub-step driving the controlling module to adjust the high-frequency switching current error according to the low-frequency ripple current, wherein the controlling module adjusts the high-frequency duty ratio according to the high-frequency switching current error so as to enable the high-frequency inverter module to output the second current.

10. The power converting method with the high-frequency inverter module compensating the low-frequency inverter module of claim 8, wherein the low-frequency switching current error is represented as the following equation:

$$\Delta i_{k,L}[n+1] = i_{cf,L,T_L}[n+1] i_{LD,L,T_L}[n+1] - i_{ik,L,T_L}[n];$$

wherein $\Delta i_{k,L}$ is the low-frequency switching current error, $i_{cf,L,T_L}$ is an outputting capacitor current, $i_{LD,L,T_L}$ is a load current, and $i_{ik,L,T_L}$ is a low-frequency inductor feedback current.

11. The power converting method with the high-frequency inverter module compensating the low-frequency inverter module of claim 8, wherein the high-frequency duty ratio is represented as the following equation:

$$D_{k,H}[m+1] = \frac{1}{2} + \frac{L_{ik,H,T_H}[m]\Delta i_{k,H}[m+1]}{2V_{DC,T_H}[m]T_{s,H}} + \frac{v_{ck,T_H}[m]}{2V_{DC,T_H}[m]};$$

wherein $D_{k,H}$ is the high-frequency duty ratio, $L_{ik,H,T_H}$ is a high-frequency inductance, $\Delta i_{k,H}$ is the high-frequency switching current error of the high-frequency inverter module, $V_{DC,T_H}$ is the direct current voltage having a high switching frequency, $T_{s,H}$ is a high-frequency sampling period, m is another given period, and $v_{ck,T_H}$ is an outputting capacitor voltage.

12. The power converting method with the high-frequency inverter module compensating the low-frequency inverter module of claim 8, wherein the high-frequency switching current error is represented as the following equation:

$$\Delta i_{k,H}[m+1] = i_{cf,H,T_H}[m+1] + i_{LD,H,T_H}[m+1] - i_{ik,H,T_H}[m] - i_{rprefk,T_H}[m+1];$$

wherein $\Delta i_{k,H}$ is the high-frequency switching current error, $i_{cf,H,T_H}$ is an outputting capacitor current, $i_{LD,H,T_H}$ is a load current, $i_{ik,H,T_H}$ is a high-frequency inductor feedback current, m is another given period, and $i_{rprefk,T_H}$ is a ripple compensating current command.

\* \* \* \* \*